May 21, 1940.  T. A. PEIRCE  2,201,742

ZODIAC RECKONER

Original Filed Dec. 9, 1936    4 Sheets-Sheet 1

Inventor
T. A. Peirce
By Clarence A. O'Brien
and Hyman Berman, Attorneys

May 21, 1940.  T. A. PEIRCE  2,201,742
ZODIAC RECKONER
Original Filed Dec. 9, 1936   4 Sheets-Sheet 2
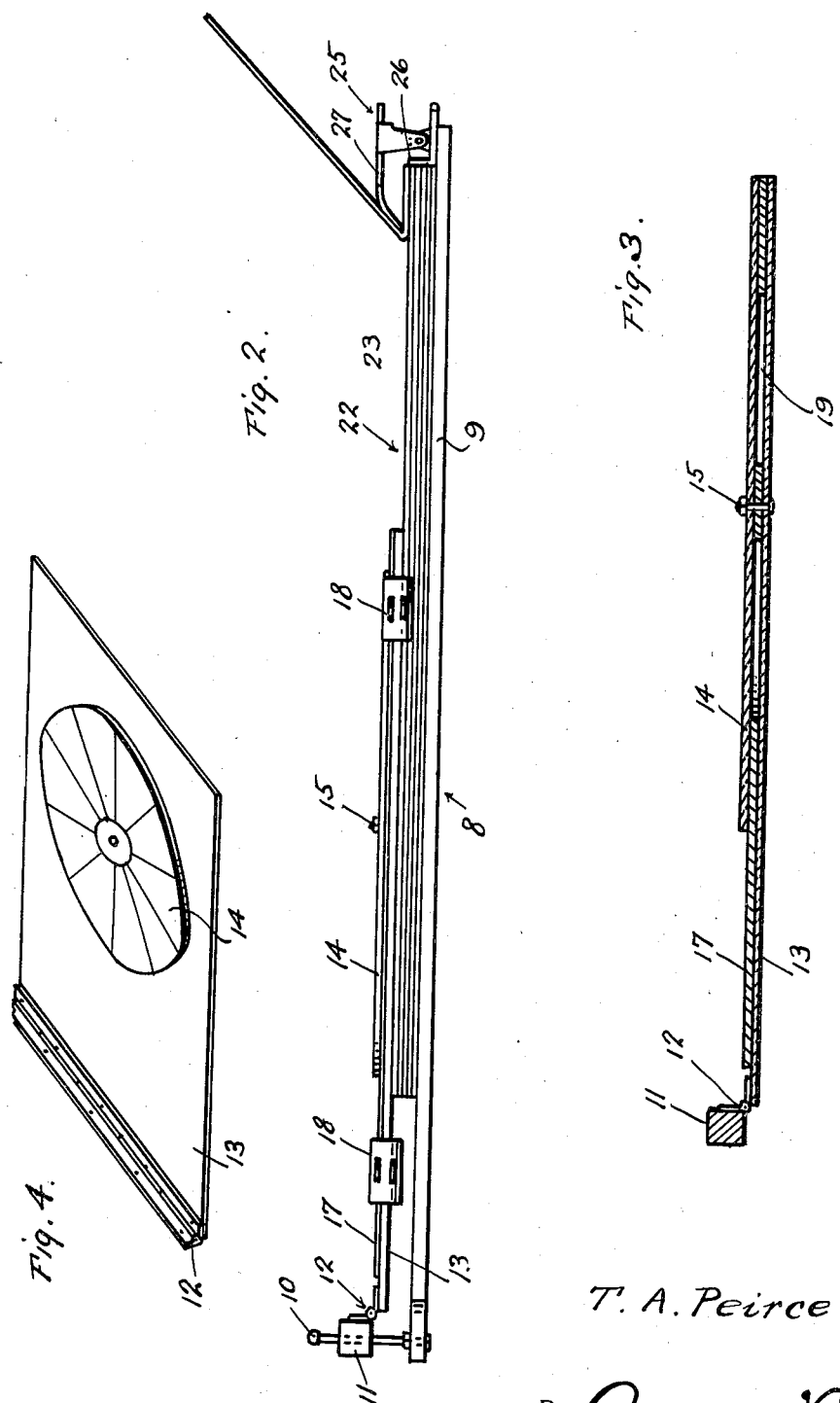
Inventor
T. A. Peirce
By Clarence A O'Brien
and Hyman Berman  Attorneys May 21, 1940.   T. A. PEIRCE   2,201,742
ZODIAC RECKONER Original Filed Dec. 9, 1936   4 Sheets-Sheet 3

Inventor
T. A. Peirce
By Clarence A. O'Brien
and Hyman Berman   Attorneys

Patented May 21, 1940

2,201,742

UNITED STATES PATENT OFFICE 2,201,742

ZODIAC RECKONER

Thomas Anderson Peirce, Fort Worth, Tex.

Refiled for abandoned application Serial No. 115,248, December 9, 1936. This application January 5, 1940, Serial No. 312,584

3 Claims. (Cl. 35—44)

The present invention relates to improvements in "zodiac reckoners", and the principal object in view is to provide amateur and professional astrologers with ready reference equipment for expeditiously charting and forecasting astronomical and astrological facts for clients and others.

This application is a refiling of my abandoned application Serial No. 115,248, filed December 9, 1936.

As explanatory, the zodiac of the sun with which astrological readings are concerned comprises a circular belt around the sun divided into twelve signs or divisions each thirty degrees wide and through which the earth each year, in its transit around the sun, progresses by degrees, one division each month, and one degree each day. The planets also revolve or transit around the sun, as will be understood, assuming different positions in the zodiac each day designated in the art as "aspects". In astrological readings different characteristics, propensities, or, generally speaking "influences" are attributed to the signs or divisions of the zodiac. Similarly different powers, or "natures" are attributed to the planets. The background or inherent character of an individual is determined by the division and degree therein occupied by the sun at the date of birth. Other attributes and events in the life of the individual are prognosticated by combining "influences" of the sign or division concerned with the "nature" of the planets occupying the particular sign or division concerned in the reading during the particular birth date concerned. Future events are foretold by the positions or "aspects" of the planets relative to said sign or division during days succeeding the birth date.

I shall not attempt to recount here the laborious tasks and time-consuming procedures now followed in determining and systematically recording zodiacal reckonings at present employed. Needless to say, considerable paraphernalia and chart making, by hand or otherwise, is required. For example, a different chart, commonly called an "aspector" giving the positions of the planets for each day of the year must be drawn for comparison with a chart of the zodiac. I have therefore discovered the need for a simple and inexpensive time-saving device which, it is believed, is aptly fitted to facilitate assembling information for clients having to do with the signs of the zodiac and the heavenly bodies in our solar system.

In reducing to practice the preferred embodiment of the inventive conception, I have evolved and produced a structural arrangement characterized essentially by what may be conveniently called a holder for the chart and other printed blank forms and paraphernalia constituting the needed equipment for use.

Stated otherwise, although the invention embodies the use of certain selectively employable printed matter, the factor of chief importance is the apparatus or device which serves as the special adapter means for said printed matter, enabling it to be systematically handled and utilized for estimating or calculating the facts to be used as a guide on the client's record sheet for future reference purposes.

Other features and advantages will become more readily apparent from the following description and drawings.

In the accompanying drawings, wherein like numerals are employed to designate like parts throughout the various views:

Figure 2 is an edge elevational view of the assembly seen in Figure 1.

Figure 3 is a central longitudinal sectional view through the hinged dial and record sheet carrier panel.

Figure 4 is a perspective view of said panel with the printed record sheet detached.

Figure 1:
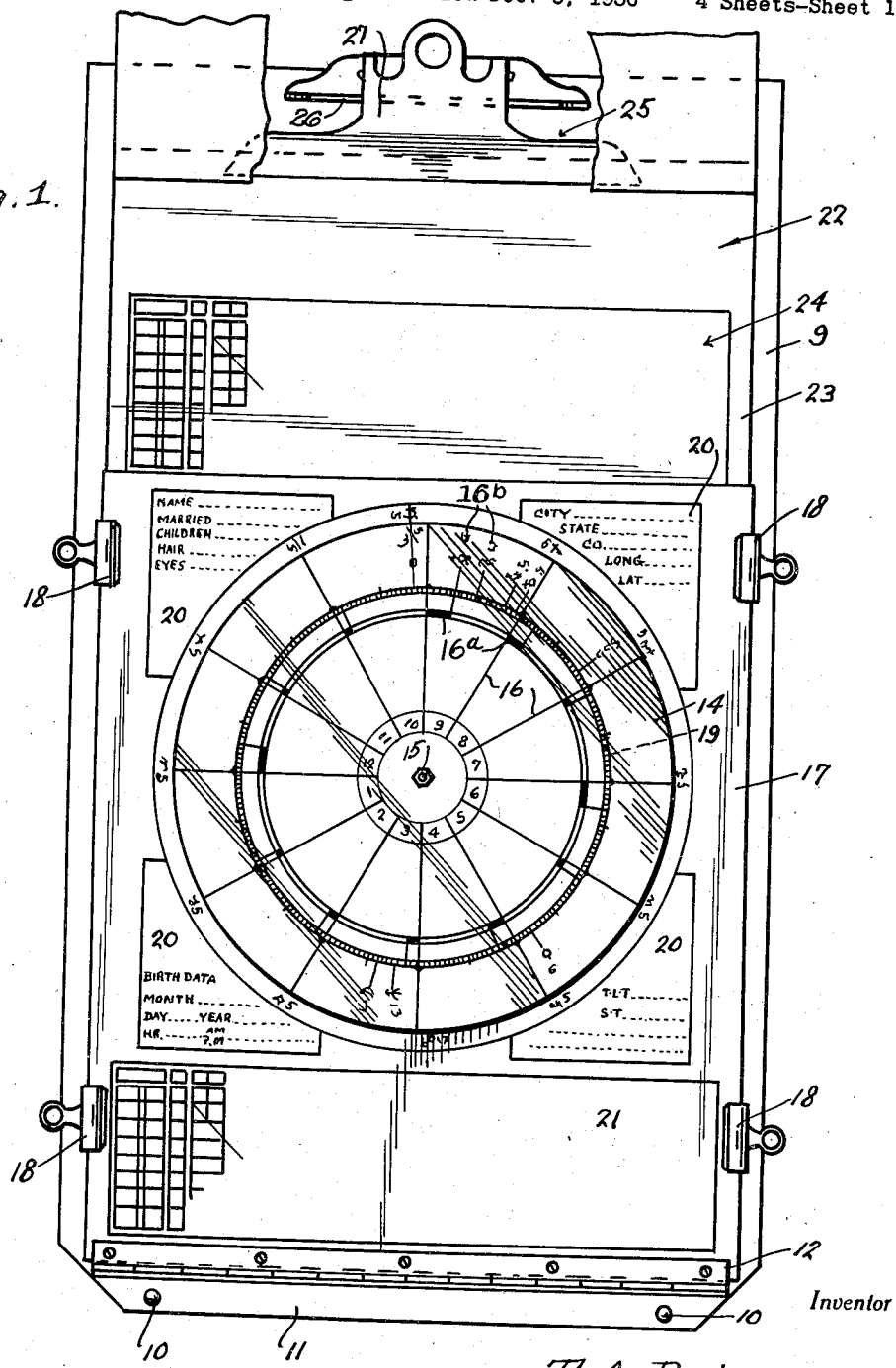
Figure 1 is a top plan view of the complete apparatus or device set up and ready for use, certain portions being broken away for convenience of illustration.

Referring to the drawings by numerals that part of the assemblage constituting the holder for the removable parts is denoted by the numeral 8 (see Figure 2). This phase of the invention comprises a wooden board or the like of general rectangular form and of suitable proportions, which constitutes a base 9. At one end thereof I provide a pair of removable upstanding posts or pins 10 headed at their upper ends. A vertically operable adapter bar 11 is slidably mounted on these and is movable in a vertical or perpendicular line toward and from the base in parallelism thereto. This bar serves to accommodate a suitable hinge fixture 12 which joins thereto a transparent panel 13 which may be moved up and down in true parallelism in conjunction with the bar 11 to vary the elevation thereof with respect to the board or base 9, or said panel 13 can be swung in an arcuate path on the hinge 12. A transparent dial is denoted by the numeral 14 and is detachably and pivotally mounted on the panel, as indicated at the point 15. This dial may be of celluloid or some equivalent cellulose material. The dial is in effect a manually controllable indicator, and is properly calibrated. Without attempting to go into the exact details, it may be mentioned that the dial, for example, is characterized primarily by a plurality of radial, circumferentially spaced lines 16 which, as shown in Figure 1, define the twelve divisional cusp lines of the signs of the zodiac and is further distinguished by aspect zones 16—a and symbols 16—b related to said lines.

Figure 6:
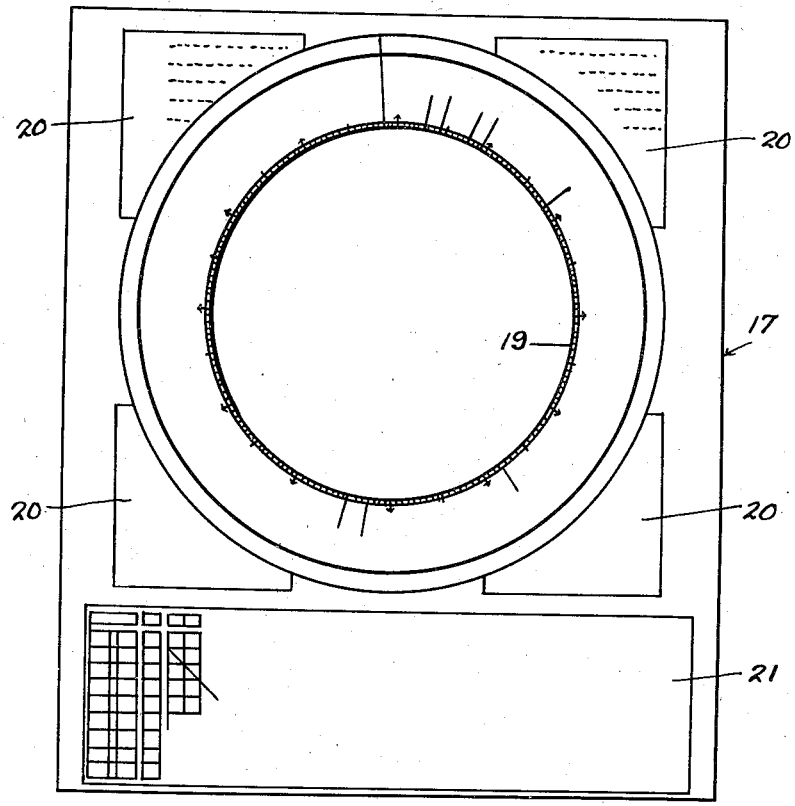
Figure 6 is a plan view of the printed blank form constituting the hereinafter designated record sheet.
Figure 5:
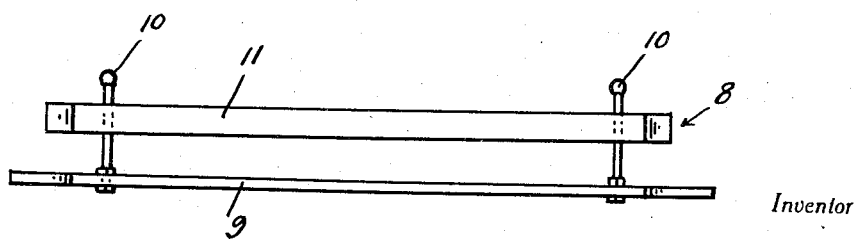
Figure 5 is an end view of Figure 2, that is, a view observing it from left to right, with the reference book removed.

In conjunction with the transparent panel 13 and the transparent indicator disk or dial I use printed paper record sheets, one of which is shown in place in Figure 1 and denoted by the numeral 17. The sheet is placed on the panel and held in place by suitable clips or clamps 18. This record sheet is shown to advantage in Figure 6, from which it will be observed that it has a central opening 19 of a diameter less than the indicator dial or disk 14. The marginal edge of the opening is properly calibrated with degree marks for coaction with the zodiacal lines 16. The marginal edge portion of the dial projects beyond the edge of the opening 19 so that the calibrations around said opening may be read through said dial. Incidentally, it is deemed unnecessary, so far as the novelty claimed is concerned, to describe in detail the various printed features of said record sheets. All that is probably necessary is to bring out the fact that it is centrally apertured and properly charted and calibrated and provided with different areas 20 and 21 to receive penciled memoranda such as birth date, during the period of reckoning or forecasting of zodiacal information. It might be further added that the record sheet 17 is applied on the panel to cooperate with the calibrated dial when interviewing a client, and as the information is computed by properly operating the dial, the data is written into the various blank forms for future reference or memorandum purposes.

Figure 7:
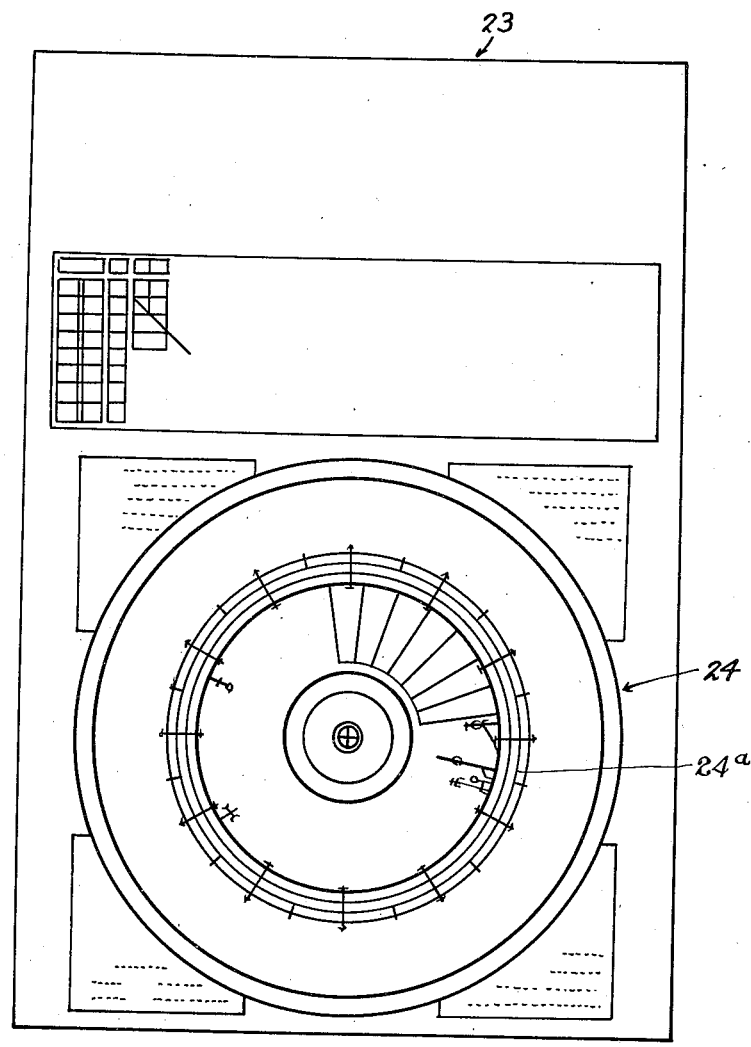
Figure 7 is a top plan view of one of the pages constituting a selectively usable chart in the reference chart book, containing transit planet positions (the printed text matter being omitted to avoid confusion).

Used in conjunction with the indicator-equipped panel, which is in effect a holder for the record sheet 17, is a printed reference book denoted generally by the numeral 22. This book is made up of a plurality of leaves 23 called charts. The charts are for selective use, that is, each chart contains in circular arrangement fixed information relative to past, present and future planets' positions, or in other words the positions of the planets for each day in the year charted in their circular orbits of transit designated 24—a and around which the marginal edges of the opening 19 in the record sheet 17 fits, it being the idea of the invention to select the proper chart and to match the adjustable dial 14 with the different features of the chart in order to reckon or estimate the information desired for the particular client whose future is being read. In Figure 7 I show one of the charts, this being a permanent printed leaf having various printed indicia 24 thereon for coordination with the companion features of the record sheet and calculating dial 14.

The numeral 25 in Figure 2 designates a suitable clamp including a fixed stop 26 and a hinged retention element 27, which features serve to hold the book on the base 9 so that its leaves come beneath the panel 13 and manually adjusted dial 14. By lifting up the panel 13, the printed pages or leaves 23 of the book 22 of planet positions may be turned and the proper chart showing the planet positions for the year, month, week and day under consideration may be selected for comparison with the client's stationary planet positions for his particular year, month, and day of birth, which are drawn in by hand on record sheet 17 at the time of the client's request for astrological information. This procedure results in scientific and accurate information as to the relationship of the client's planet positions at the time of birth to the transiting positions of the planets current or selected year as shown in the printed book of planet positions by the degree and sign they are found to occupy in the zodiac.

Referring briefly to the cause of the invention, the positions of the planets at a given date birth are indicated on the record sheet 17 around the cut out or circular edge thereof, said positions being located by means of the degree calibrations, it being understood that the dial 14 is first detached and the record sheet 17 clamped to the panel 13. The positions of the planets may be ascertained from the proper leaf 23 of the book 22. The dial 14 is then attached in position on the panel 13 and turned until the sign or division concerned in the reading is in proper location as determined in a manner which need not be entered into herein. It is sufficient to explain that by the described procedure a chart is established placing the right planets in the right signs or division for a reading of the inherent characteristics and propensities of the individual concerned. Further readings may be obtained by turning the leaves 23 of the book 22 forwardly or backwardly thereby ascertaining the positions of the planets during succeeding or preceding days relative to the signs of the zodiac on the dial 14 such variations in position being visible through said dial and thus through the panel 13.

It is submitted that in a device of this kind we have a multiple astrological chart and an aspector with the moving positions of the planets all combined into one structure. This saves considerable time and money in estimating the natal and transition aspects. By placing the dial wheel or indicator 14 over the selected charts in the book, planets in aspect to each other or the sun degrees will show up in the proper zone. Under this arrangement I entirely eliminate the use of an aspect sheet and time necessary for inserting the transiting positions of planets, etc. It further eliminates drawing of more than one birth or natal chart which is record sheet 17 for each client, as in this arrangement the charts in the book containing the transiting planets may be used over and over again.

For professional astrologers any desired number of days and years of planets' positions could be prepared in advance, thereby saving the time necessary in preparing a chart after a client calls. Professional astrologers transacting business by correspondence will find a structure of this type substantially indispensable.

Novelty is thought to reside, for example, in the provision of the holder for the information or reference book 22 characterized by the base 9 and having means 25 at one end thereof for holding the book in a readily usable position and having means at the opposite end to adjustably accommodate the manually manipulated indicator which cooperates with the various leaves of the book. Further novelty is directed to the features 11 and 12 cooperable with the pins 10 in allowing the device 13 as a unit to be bodily moved toward and from the base 9 or to be swung through an arc on the hinge means 12. Then, too, novelty apparently resides in the use of the detachable record sheet 17 having the centrally apertured area designed to be removably clamped on the transparent panel 13 so that the superimposed relatively movable dial 14 may be adjusted to cooperate with the printed indicia thereon, as well as permitting the information in the record book to be seen through the dial 14, the transparent panel 13 and the central opening 19 in the record sheet 17.

It is thought that this description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

1. Apparatus for reckoning the positions of planets relative to the zodiac comprising a support, a book including a series of leaves having delineated thereon the positions of planets relative to the zodiac during different days of the year, means to secure the book to the base whereby the leaves of the book may be turned to selectively expose the same, a transparent panel pivotally mounted on the base to swing down flat over said leaves for inspection of selected leaves and for adjustment from over said leaves to permit the turning of the same, and a transparent circular dial mounted on the panel to swing therewith down over said leaves for viewing the latter therethrough and through said panel, said dial having the divisional cusp lines of the zodiac and their relative aspect zones and symbols delineated thereon and being rotatable to vary the relative positions of the signs of the zodiac and the said planets.

2. Apparatus for reckoning the positions of planets relative to the zodiac comprising a support, a book including a series of leaves having delineated thereon the positions of planets relative to the zodiac during different days of the year, means to secure the book to the base whereby the leaves of the book may be turned to selectively expose the same, a transparent panel pivotally mounted on the base to swing down flat over said leaves for inspection of selected leaves and for adjustment from over said leaves to permit the turning of the same, and a transparent circular dial mounted on the panel to swing therewith down over said leaves for viewing the latter therethrough and through said panel, said dial having the divisional cusp lines of the zodiac and their relative aspect zones and symbols delineated thereon and being rotatable to vary the relative positions of the signs of the zodiac and the said planets, and a record sheet secured to said panel and having a central circular aperture for registration circumferentially with said dial and for inspection of said leaves therethrough and through said dial and panel, said sheet being adapted for the marking thereon around said opening of planet positions as viewed through said opening, dial and panel to thereby establish a fixed record of planetary positions relative to said zodiac.

3. Apparatus for reckoning the positions of planets relative to the zodiac comprising a support, a book including a series of leaves adapted to be turned for selection thereof and having delineated thereon positions of planets relative to the zodiac during different days, respectively, means to secure the book to the support whereby the leaves of the book may be turned to selectively expose the same, and a transparent circular dial mounted on the support to swing down over said leaves for viewing the latter therethrough, said dial having the divisional cusp lines of the zodiac and their relative aspect zones and symbols delineated thereon and being rotatable to vary the relative positions of the signs of the zodiac and said planets.

THOMAS ANDERSON PEIRCE.